(12) United States Patent
Chen et al.

(10) Patent No.: US 9,330,487 B2
(45) Date of Patent: May 3, 2016

(54) APPARATUS AND METHOD FOR PROCESSING 3D IMAGES THROUGH ADJUSTMENT OF DEPTH AND VIEWING ANGLE

(71) Applicant: MStar Semiconductor, Inc., Hsinchu Hsien (TW)

(72) Inventors: Chung-Yi Chen, Puli Township (TW); Chien-Chuan Yao, ChuPei (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 80 days.

(21) Appl. No.: 13/738,414

(22) Filed: Jan. 10, 2013

(65) Prior Publication Data
US 2013/0181984 A1 Jul. 18, 2013

(30) Foreign Application Priority Data

Jan. 17, 2012 (TW) ................ 101101839 A

(51) Int. Cl.
*G06T 15/10* (2011.01)
*H04N 13/00* (2006.01)

(52) U.S. Cl.
CPC ............ *G06T 15/10* (2013.01); *H04N 13/0011* (2013.01); *H04N 13/0014* (2013.01); *H04N 13/0022* (2013.01)

(58) Field of Classification Search
USPC ......................................................... 345/419
See application file for complete search history.

(56) References Cited

U.S. PATENT DOCUMENTS

| | | | | |
|---|---|---|---|---|
| 5,576,772 A | * | 11/1996 | Kondo | .......................... 348/699 |
| 5,929,913 A | * | 7/1999 | Etoh | ......................... 375/240.11 |
| 7,468,745 B2 | | 12/2008 | Xin et al. | |
| 2005/0135485 A1 | * | 6/2005 | Nair et al. | ................ 375/240.16 |
| 2007/0064800 A1 | | 3/2007 | Ha | |
| 2007/0081096 A1 | * | 4/2007 | Klein Gunnewiek et al. | ........................... 348/416.1 |
| 2008/0158347 A1 | * | 7/2008 | Liu et al. | ........................... 348/51 |
| 2011/0044664 A1 | * | 2/2011 | Yukawa et al. | ................. 386/328 |
| 2011/0050847 A1 | * | 3/2011 | Sasaki et al. | ..................... 348/42 |
| 2011/0122227 A1 | * | 5/2011 | Kim | ................. 348/43 |
| 2011/0149035 A1 | * | 6/2011 | Tsukagoshi | ..................... 348/43 |
| 2011/0221866 A1 | * | 9/2011 | Ohta | ............................... 348/46 |
| 2011/0234773 A1 | * | 9/2011 | Koh et al. | ........................ 348/56 |

FOREIGN PATENT DOCUMENTS

| | | | |
|---|---|---|---|
| CN | 1848965 A | 10/2006 | |
| CN | 101276060 A | 10/2008 | |

OTHER PUBLICATIONS

Chinese Office Action dated Sep. 22, 2014, 7 pages.
Taiwan Office Action, Mar. 25, 2015, 8 pages.

* cited by examiner

*Primary Examiner* — Barry Drennan
*Assistant Examiner* — Terrell Robinson
(74) *Attorney, Agent, or Firm* — Edell, Shapiro & Finnan, LLC

(57) ABSTRACT

An apparatus for processing a three-dimensional (3D) image is provided. The apparatus includes a motion estimation module and a motion interpolation module. The motion estimation module estimates a motion vector between a first object in a first-eye image and a second object in a second-eye image. The first object is the same as or similar to the second object. The motion interpolation module multiplies the motion vector by a first shift ratio to generate a first motion vector. The motion interpolation module generates a shifted first object by interpolation according to the first motion vector and the first object.

8 Claims, 7 Drawing Sheets

APPARATUS AND METHOD FOR PROCESSING 3D IMAGES THROUGH ADJUSTMENT OF DEPTH AND VIEWING ANGLE

This application claims the benefit of Taiwan application Serial No. 101101839, filed Jan. 17, 2012, the subject matter of which is incorporated herein by reference.

BACKGROUND OF THE INVENTION

1. Field of the Invention

The invention relates in general to a three-dimensional (3D) image processing technique, and more particularly, to a technique for adjusting a distance and a viewing angle relative to a 3D image and an observer of the 3D image.

2. Description of the Related Art

With advancements in related software and hardware techniques, commercial and household 3D display equipment has gradually matured, and 3D image techniques have also drawn much attention in the multimedia field. Current 3D display techniques are in general divided into an active type and a passive type.

An active 3D image display technique refers to alternately presenting left-eye and right-eye images on a monitor. Dedicated glasses worn by a viewer shield the right eye of the viewer when a left-eye image is presented and shield the left eye of the viewer when a right-eye image is presented. The visual system of the viewer automatically combines the left-eye image and the right eye image to form a 3D image. Due to vision persistence, the brief shieldings by the 3D glasses against the presented images remain unnoticed to the viewer as long as a switching frequency of the left-eye and right-eye images is fast enough.

A passive 3D image display technique refers to simultaneously presenting left-eye and right-eye images in a same image frame. Referring to FIG. 1, odd-row pixels R1, R2, R3 . . . correspond to the right-eye image, and even-row pixels L1, L2, L3 . . . correspond to the left-eye image, with the two being horizontally staggered. A passive 3D image display comprises an exteriorly adhered polarizing film. For example, a polarization angle corresponding to the odd-row pixels R1, R2, R3 . . . may be designed as 45 degrees, and polarization angle corresponding to the even-row pixels L1, L2, L3 may be designed as 135 degrees. Thus, the left lens and the right lens of the glasses worn by the viewer respectively allow the passing of light beams with a polarization angle of 45 degrees and 135 degrees, so that different images can be received by the left and right eyes, respectively. Similarly, the viewer automatically combines the left-eye image and the right eye image received at the same time through human visual characteristics to form a corresponding 3D image.

For both of the active and passive 3D image display techniques, the completed left-eye images and right-images can only be modified or adjusted with complex and expensive devices. However, a trend to provide a user with user-independent options and flexibilities for adjusting image content emerges, such as allowing a user to manually adjust brightness, contrast and depth of 3D images.

SUMMARY OF THE INVENTION

The invention is directed to an apparatus and method for processing a 3D image to fulfill the need for adjusting a depth and a viewing angle of the 3D image. In the apparatus and method for processing a 3D image of the invention, the depth and viewing angle of the 3D image can be adjusted through motion estimation and motion interpolation without implementing a dedicated and complex 3D image device.

According to one embodiment the present invention, a 3D image processing apparatus is provided. The apparatus includes a motion estimation module and a motion interpolation module. The motion estimation module estimates a motion vector between a first object in a first-eye image and a second object in a second-eye image. The first object is the same as or similar to the second object. The motion interpolation module multiplies the motion vector by a first shift ratio to generate a first motion vector, and generates a shifted first object by interpolation according to the first motion vector and the first object.

In an alternative embodiment of the present invention, the motion interpolation module further multiplies the motion vector by a second shift ratio to generate a second motion vector, and generates a shifted second object according to the second motion vector and the second object.

According to another embodiment the present invention, a 3D image system is provided. In addition to the above motion estimation module and motion interpolation module, the 3D image system further includes a playback module for simultaneously or alternately playing modified left-eye and right-eye images.

According to yet another embodiment the present invention, a 3D image processing method is provided. The method includes steps of: estimating a motion vector between a first object in a first-eye image and a second object in a second-eye image, the first object being the same or similar to the second object; multiplying the motion vector by a first shift ratio to generate a first motion vector; and generating a shifted first object according to the first motion vector and the first object.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 2:
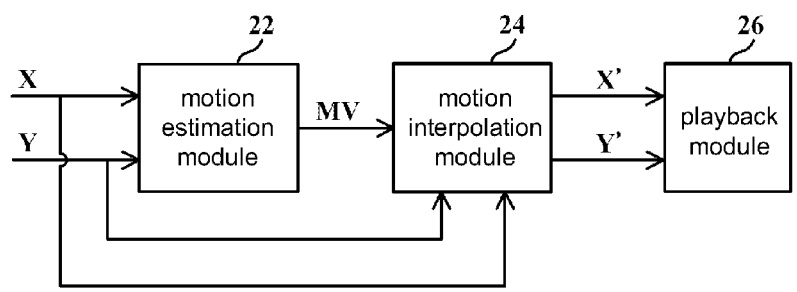
FIG. 2 is a block diagram of a 3D image processing apparatus according to one embodiment of the present invention.

FIG. 2 shows a three-dimensional (3D) image processing apparatus 200 according to one embodiment of the present invention. The 3D image processing apparatus 200 includes a motion estimation module 22, a motion interpolation module 24 and a playback module 26. In practice, the 3D image processing apparatus 200 may be integrated in a system featuring a 3D image playback function, such as a television, a DVD player or a computer. It should be noted that the playback module 26 is an optional component of the 3D image processing apparatus 200.

Figure 3:
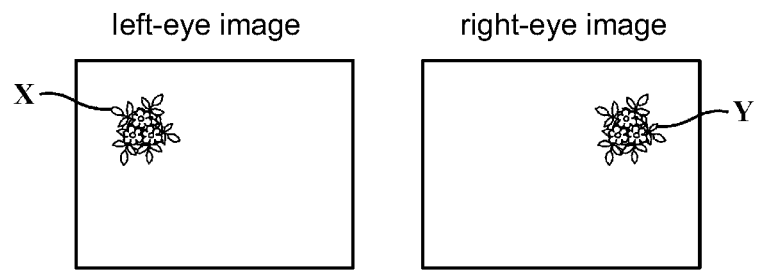
FIG. 3 is an example of a left-eye image and a corresponding right-eye image.
Figure 4A:
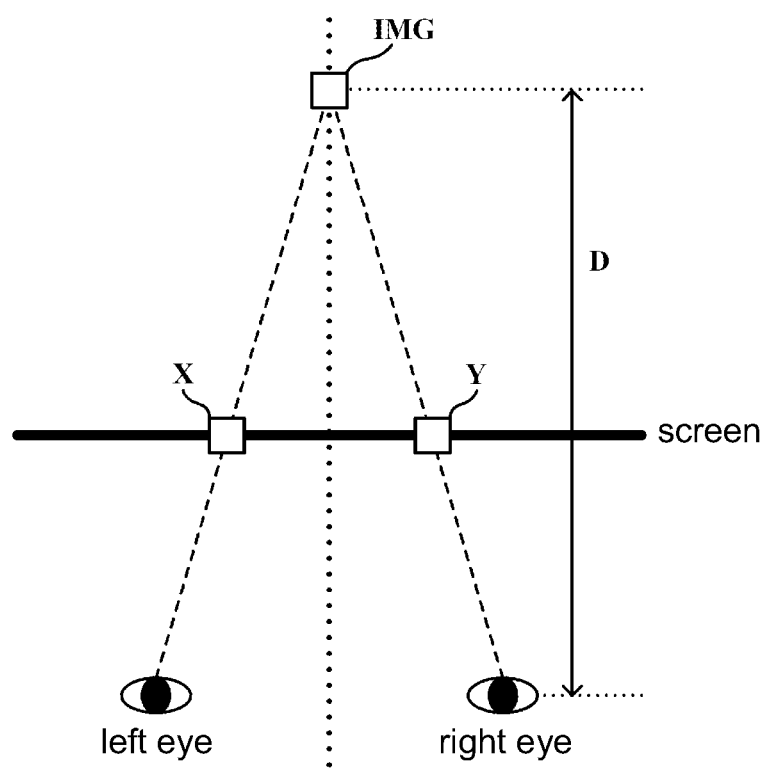
FIGS. 4A to 4E are examples of forming an image according to different shift ratios.

FIG. 3 shows an example of a left-eye image and a corresponding right-eye image. In this example, an object X in the left-eye image and an object Y in the right-eye image correspond to a same potted plant. The object X and the object Y may be identical, or may be similar but slightly different. After simultaneously or sequentially (alternately) viewing the left-eye and right-eye images, the viewer combines the object X and the object Y into a 3D image of the potted plant. FIG. 3 also depicts that a position of the object X in the left-eye image differs from a position of the object Y in the right-eye image. More specifically, the object X is presented at the left half of the screen, whereas the object Y is presented at the right half of the screen. Referring to FIG. 4A, a combined image IMG perceived by the viewer is formed behind the screen, and a depth of the combined image IMG perceived by the viewer is D.

Figure 4B:
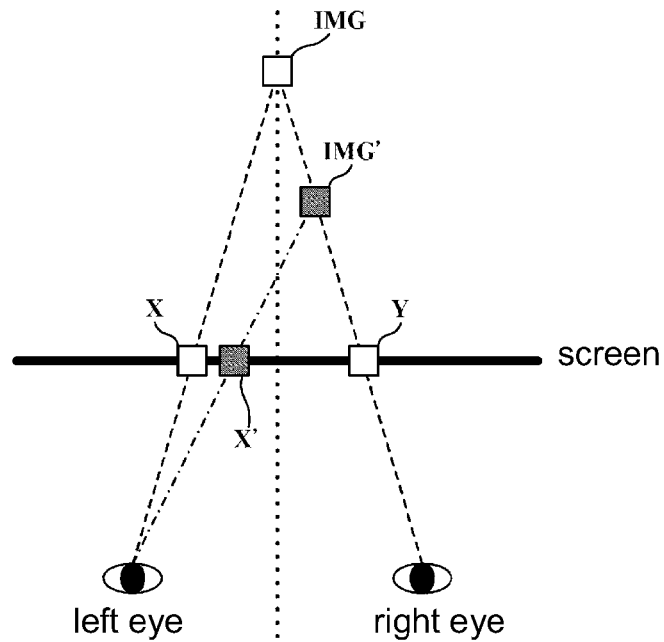
Figure 4C:
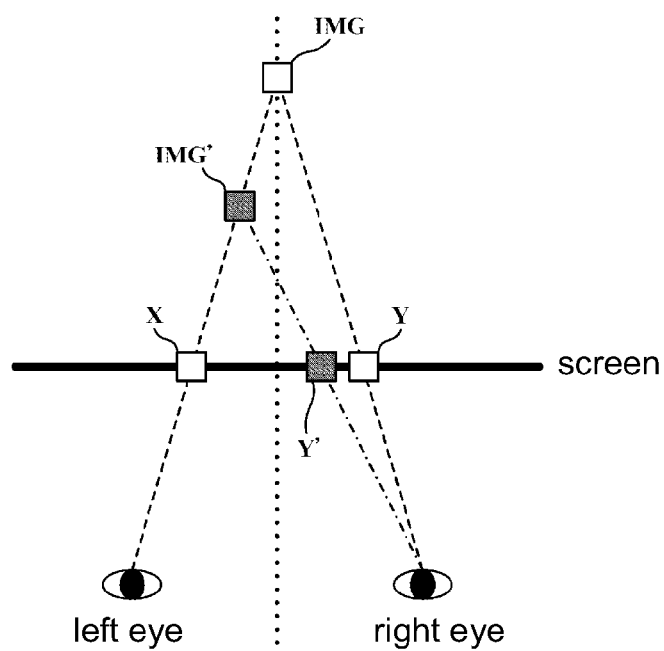
Figure 4D:
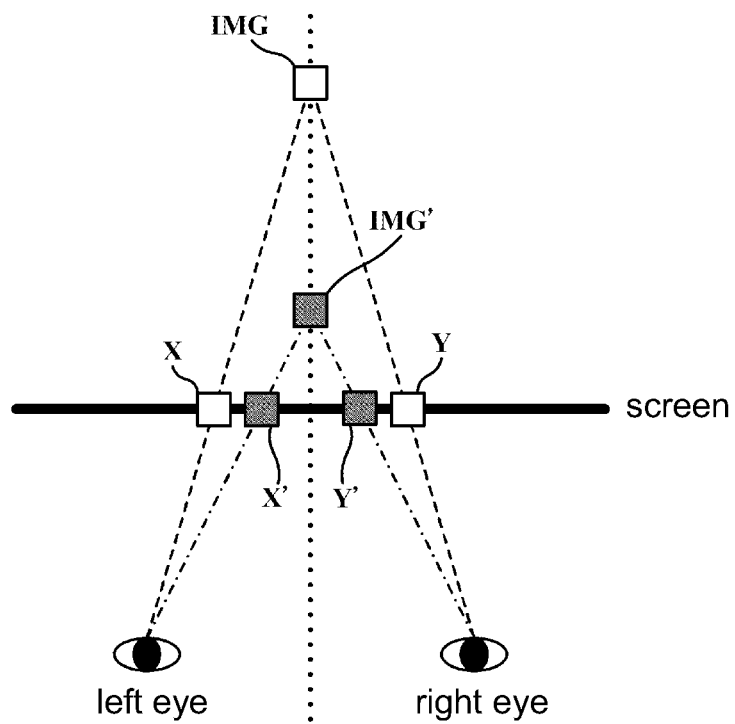
Figure 4E:
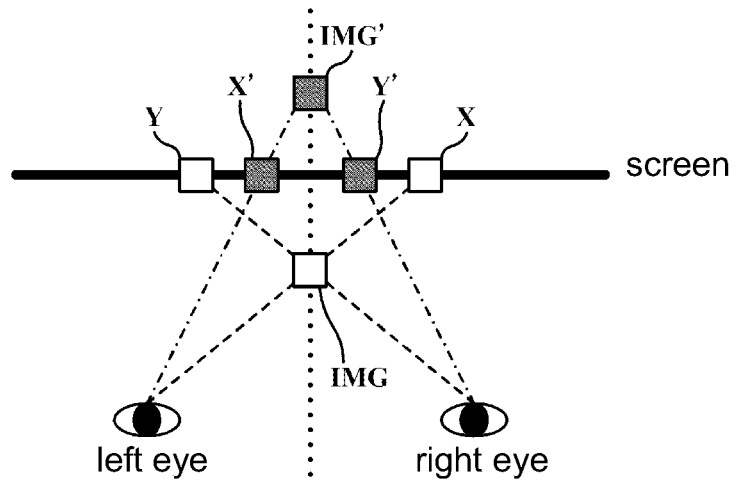

Referring to FIG. 4B, if the object X in the left-eye image is replaced by an object X' while the object Y in the right-eye image remains unchanged, a combined image perceived by the viewer becomes IMG'. Compared to the image IMG, the viewer feels that the image IMG' is located more to the right and has a smaller depth (i.e., the IMG' appears to be closer and zoomed in to the viewer). Referring to FIG. 4C, if the object Y in the right-eye image is replaced by an object Y' while the object X in the left-eye image remains unchanged, a combined image IMG' perceived by the viewer is closer to the left, and appears closer and zoomed in compared to the image IMG. Referring to FIG. 4D, if the object X in the left-eye image is replaced by the object X' while the object Y in the right-eye image is also replaced by the object Y', and the displacement from the object X to the object X' is identical to the displacement from the object Y' to the object Y, the combined image IMG' perceived by the viewer appears to be at a same horizontal position but closer and zoomed in compared to the image IMG. Referring to FIG. 4E, the combined image IMG generated by the object X and the object Y may possibly form in the front of the screen. If the object X in the left-eye image is replaced by the object X' while the object Y in the right-eye image is replaced by the object Y', and the displacement from the object X to the object X' is identical to the displacement from the object Y' to the object Y, the combined image IMG' perceived by the viewer appears to be at a same horizontal position but farther and zoomed out compared to the image IMG.

It is clear from the above examples that the 3D image depth and left/right positions of the object X and/or the object Y can be adjusted by changing the positions of the object X and/or the object Y. Thus, in the 3D image processing apparatus 200 according to one embodiment of the present invention, by changing positions of objects in the left-eye image and/or the right-eye image through motion estimation and motion interpolation, the depth and/or left and right positions of one or more objects in a 3D image can be adjusted.

The motion estimation module 22 estimates a motion vector between a first object in a first-eye image and a second object in a second-eye image. The first object is the same as or similar to the second object. Taking FIG. 3 as an example, the motion estimation module 22 determines a coordinate of a center of the object X in the left-eye image and a coordinate of a center of the object Y in the right-eye image, and calculates a displacement of the two coordinates as a motion vector MV between the object X and the object Y. An example of taking the first-eye image as a left-eye image and the second-eye image as a corresponding right-eye image shall be described. The left-eye image includes a left-eye object X, and the right-eye image includes a right-eye object Y. Image content of the objects X and Y may be identical or similar but different.

Figure 5A:
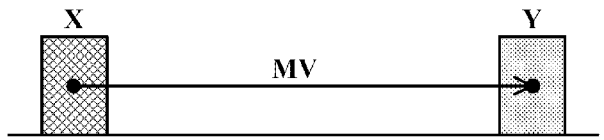
FIG. 5A is a schematic diagram of a motion vector between two objects.
Figure 5B:
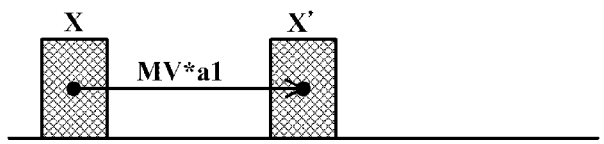
FIGS. 5B and 5C are a shifted left-eye object and a shifted right-eye object.
Figure 5C:
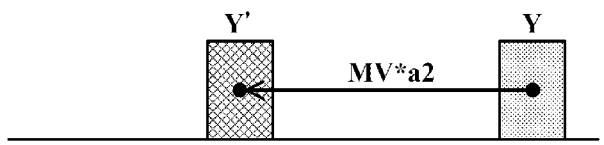

Assume the motion vector MV between left-eye object X and the right-eye image Y is already identified by the motion estimation module 22, as shown in FIG. 5A. The motion interpolation module 24 first multiplies the motion vector MV by a first shift ratio a1 to generate a first motion vector MV*a1. Referring to FIG. 5B, the motion interpolation module 24 generates a shifted left-eye image including a shifted left-eye object X', by interpolation according to the first motion vector MV*a1 and the left-eye image including the left-eye object X. Similarly, referring to FIG. 5C, the motion interpolation module 24 also multiplies the motion vector MV by a second shift ratio a2 to generate a second motion vector MV*a2. According to the second motion vector MV*a2 and the right-eye image including the right-eye object Y, the motion interpolation module 24 generates a shifted right-eye image including a shifted right-eye object Y' by interpolation.

In practice, an object generated by interpolation may be the same as or different from an original object. In one embodiment, the shifted left-eye object X' and the left-eye object X are identical. In another embodiment, the motion interpolation module 24 generates the shifted left-eye object X' according to the left-eye object X by an interpolation algorithm, and generates the shifted right-eye object Y' according to the right-eye object Y also by the interpolation algorithm. In yet another embodiment, the motion interpolation module 24 generates the shifted left-eye object X' and the shifted right-eye object Y' according to the left-eye object X and the right-eye object Y by another interpolation algorithm.

The first shift ratio a1 and the second shift ratio a2 are not limited to specific values. In addition, the first shift ratio a1 and the second shift ratio a2 may be the same or different.

An example of the motion vector MV depicted in FIG. 5A shall be given. In response to a request for moving a combined image corresponding to the objects X and Y to the right and zooming in the image (e.g., as shown in FIG. 4B), the motion interpolation module 24 sets the first shift ratio a1 as a positive number. Thus, the first motion vector MV*a1 generated is in a same direction as the motion vector MV, so that the shifted left-eye object X' is relatively at the right of the left-eye object X. Meanwhile, the motion interpolation module 26 may set the second shift ratio a2 to zero, so that the shifted right-eye object Y' remains at the same position of the right-eye object Y. Alternatively, the procedure for generating the shifted right-eye object Y' is not performed at all. It should be noted that, the remaining part except the object X of the left-eye image and the remaining part except the object Y of the right-eye image may substantially stay unchanged, or may be applied by corresponding changes resulted from shifting the objects X and Y.

In response to a request for moving a combined image corresponding to the objects X and Y to the left and zooming in the image (e.g., as shown in FIG. 4C), the motion interpolation module 24 sets the first shift ratio a1 to zero and sets the second shift ratio a2 as a negative number. Thus, the second motion vector MV*a2 generated is in an opposite direction from the motion vector MV, so that the shifted right-eye object Y' is relatively at the left of the right-eye object Y.

Further, in response to a request for zooming in a combined image corresponding to the objects X and Y but keeping the horizontal position unchanged (e.g., as shown in FIG. 4D), the motion interpolation module 24 sets the first shift ratio a1 as a positive number and sets the second shift ratio a2 as a negative number, with an absolute value of the first shift ratio a1 being equal to an absolute value the second shift ratio a2. Thus, the first motion vector MV*a1 generated is in an opposite direction from the second motion vector MV*a2 generated, so that the shifted left-eye object X' is relatively at the right of the left-eye object X and the shifted right-eye object Y' is relatively at the left of the right-eye object Y.

Further, in response to a request for zooming out a combined image corresponding to the objects X and Y but keeping the horizontal position unchanged (e.g., as shown in FIG. 4E), the motion interpolation module 24 sets the first shift ratio a1 as a negative number and sets the second shift ratio a2 as a positive number, with an absolute value of the first shift ratio a1 being equal to an absolute value the second shift ratio a2. Thus, the first motion vector MV*a1 generated is in an opposite direction from the second motion vector MV*a2 generated, so that the shifted left-eye object X' is relatively at the left of the left-eye object X and the shifted right-eye object Y' is relatively at the right of the right-eye object Y.

Figure 6A:
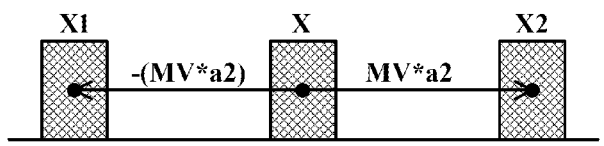
FIGS. 6A and 6B are schematic diagram of simultaneously generating different types of shifted objects.
Figure 6B:
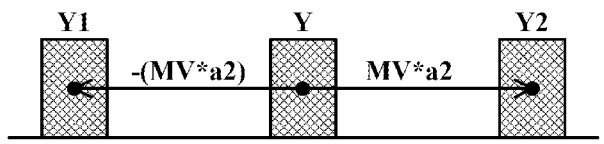

In one embodiment, referring to FIG. 6A, according to the first motion vector MV*a1 and a left-eye image including a left-eye object X, the motion interpolation module 24 is designed to simultaneously generate a left-shifted left-eye image including a left-shifted left-eye object X1 and a right-shifted left-eye image including a right-shifted left-eye object X2 by interpolation. Referring to FIG. 6B, according to the second motion vector MV*a2 and a right-eye image including a right-eye object Y, the motion interpolation module 24 further simultaneously generates a left-shifted right-eye image including a left-shifted right-eye object Y1 and a right-shifted right-eye image including a right-shifted right-eye object Y2. Subsequently, according to a request of a user or from an upper-tier request, from the left-eye image (including the left-eye object X), the left-shifted left-eye image (including the left-shifted left-eye object X1) and the right-shifted left-eye image (including the right-shifted left-eye object X2), the motion interpolation module 24 selects one image as the shifted left-eye image including the shifted left-eye object X'. Similarly, from the right-eye image (including the right-eye object Y), the left-shifted right-eye image (including the left-shifted right-eye object Y1) and the right-shifted right-eye image (including the right-shifted right-eye object Y2), the motion interpolation module 24 selects one as the shifted right-eye image including the shifted right-eye object Y'. For example, in response to a request for zooming in a combined image corresponding to the objects Y and Y but keeping the horizontal position unchanged, the motion interpolation module 24 may select the right-shifted left-eye image (including the right-shifted left-eye object X2) and the left-shifted right-eye image (including the left-shifted right-eye object Y1).

It should be noted that, the shifted left-eye objects X1 and X2 may be different from the left-eye object X. For example, the motion interpolation module 24 may interpolate each pixel in the left-eye object X according to the motion vector MV to generate the shifted left-eye objects X1 and X2. Similarly, the shifted right-eye objects Y1 and Y2 may be different from the right-eye object Y. For example, the motion interpolation module 24 may interpolate each pixel in the right-eye object Y according to the motion vector MV to generate the shifted right-eye objects Y1 and Y2.

Figure 7A:
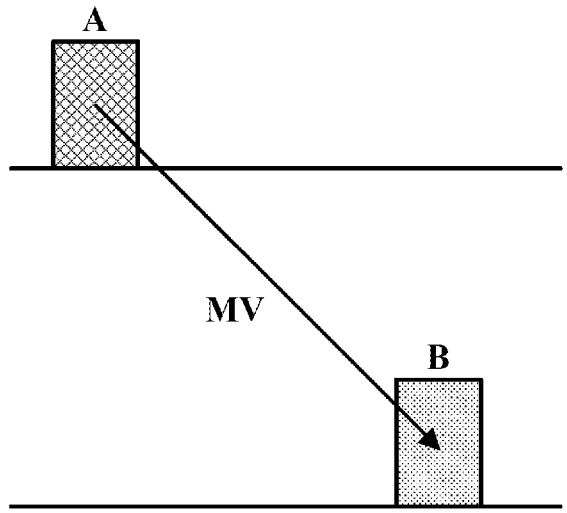
FIGS. 7A and 7B are schematic diagrams illustrating a stereotypic effect of an MEMC apparatus.
Figure 7B:
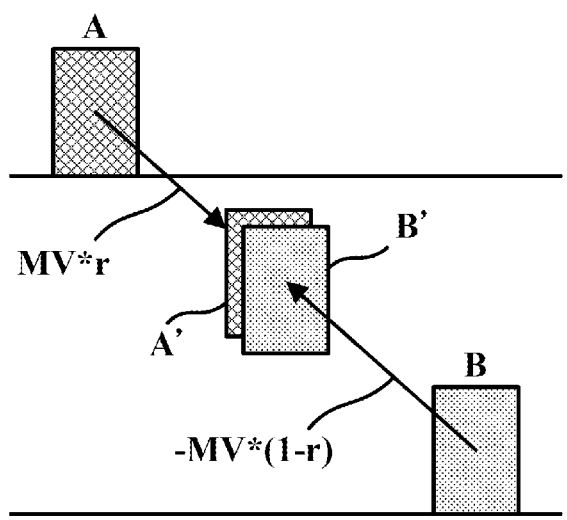

In practice, the motion estimation module 22 and the motion interpolation module 24 may be included in a same motion estimation and motion compensation (MEMO) apparatus. Conventionally, the MEMO apparatus is utilized for processing two-dimensional (2D) images. FIGS. 7A and 7B show schematic diagrams of stereotypic usage of an MEMO apparatus. Referring to FIG. 7A, the MEMO apparatus first identifies a motion vector between two original frames (frame A and frame B). In this example, the motion interpolation performed by the MEMO apparatus interpolates a new frame between the frames A and B according to the motion vector MV and the frames A and B. Content of the new frame is an average of contents of frames A' and B' in FIG. 7B. The MEMO apparatus is capable of generating the frames A' and B' according to the motion vector MV. As shown in FIG. 7B, a relative motion vector between the frame A' and the original frame A is the motion vector MV multiplied by a shift ratio r, and a relative motion vector between the frame B' and the original frame B is an opposite vector (i.e., −MV) of the motion vector MV multiplied by another shift ratio (1-r).

The shift ratio r may be regarded as the foregoing first shift ratio a1, and the shift ratio (1-r) added with a negative sign may be regarded as the foregoing second shift ratio a2. In other words, in this embodiment, a sum of the first shift ratio a1 and the negative second shift ratio a2 is 1. If the left-eye object X is selected as the original frame A and the right-eye object Y is selected as the original frame B, the shifted left-eye object X' is relatively at the right of the left-eye object X, and the shifted right-eye object Y' is relatively at the left of the right-eye object Y. For example, for a shift ratio of 0.5, the horizontal positions of the new objects X' and Y' are right in the middle of the objects X and Y in the new frame generated by interpolation to be equidistant from the objects X and Y. In another case, if the left-eye object X is selected as the original frame B and the right-eye object Y is selected as the original frame A, the shifted left-eye object X' is relatively at the left of the left-eye object, and the shifted right-eye object Y' is relatively at the right of the right-eye object Y.

As described, the 3D image processing apparatus 200 according to one embodiment of the present invention adjusts the depth as well as left and right positions of a 3D image through motion estimation and motion interpolation. The motion interpolation module 24 selects different combinations of the shift ratios a1 and a2 to generate different image formation. The shift ratios may be user-adjusted within a predetermined range by a system designer according to hardware specifications. Moreover, the motion interpolation module 24 may also solely shift either the left-eye object X or the right-eye object Y instead of simultaneously generating the shifted left-eye image and the shifted right-eye image.

It should be noted that, when a position of a newly combined image IMG' is not located on a central axis of the line of sight of the viewer as the original image IMG, a visual effect is equivalent to a situation where the viewer moves to the right or to the left of the original position. That is to say, the 3D image processing apparatus 200 is also capable of changing a viewing angle.

Figure 1:
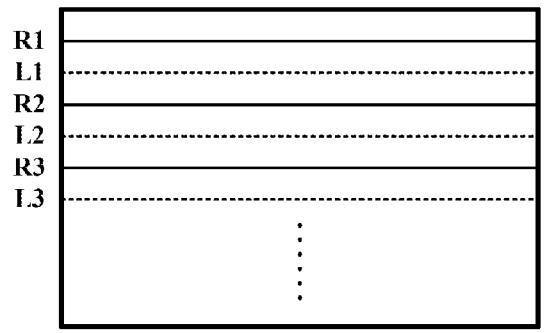
FIG. 1 is an example of a three-dimensional (3D) image.

Again referring to FIG. 2, the left-eye image and right-eye image selectively modified by the motion interpolation module 24 are provided to the playback module 26. The modified left-eye image includes the shifted left-eye object X', and the modified right-eye image includes the shifted right-eye object Y'. For an active 3D image, the playback module 26 alternately plays the modified left-eye image and right-eye image. For a passive 3D image, the playback module 26 simultaneously plays the modified left-eye image and the modified right-eye image in a staggered manner, as shown in FIG. 1.

Figure 8:
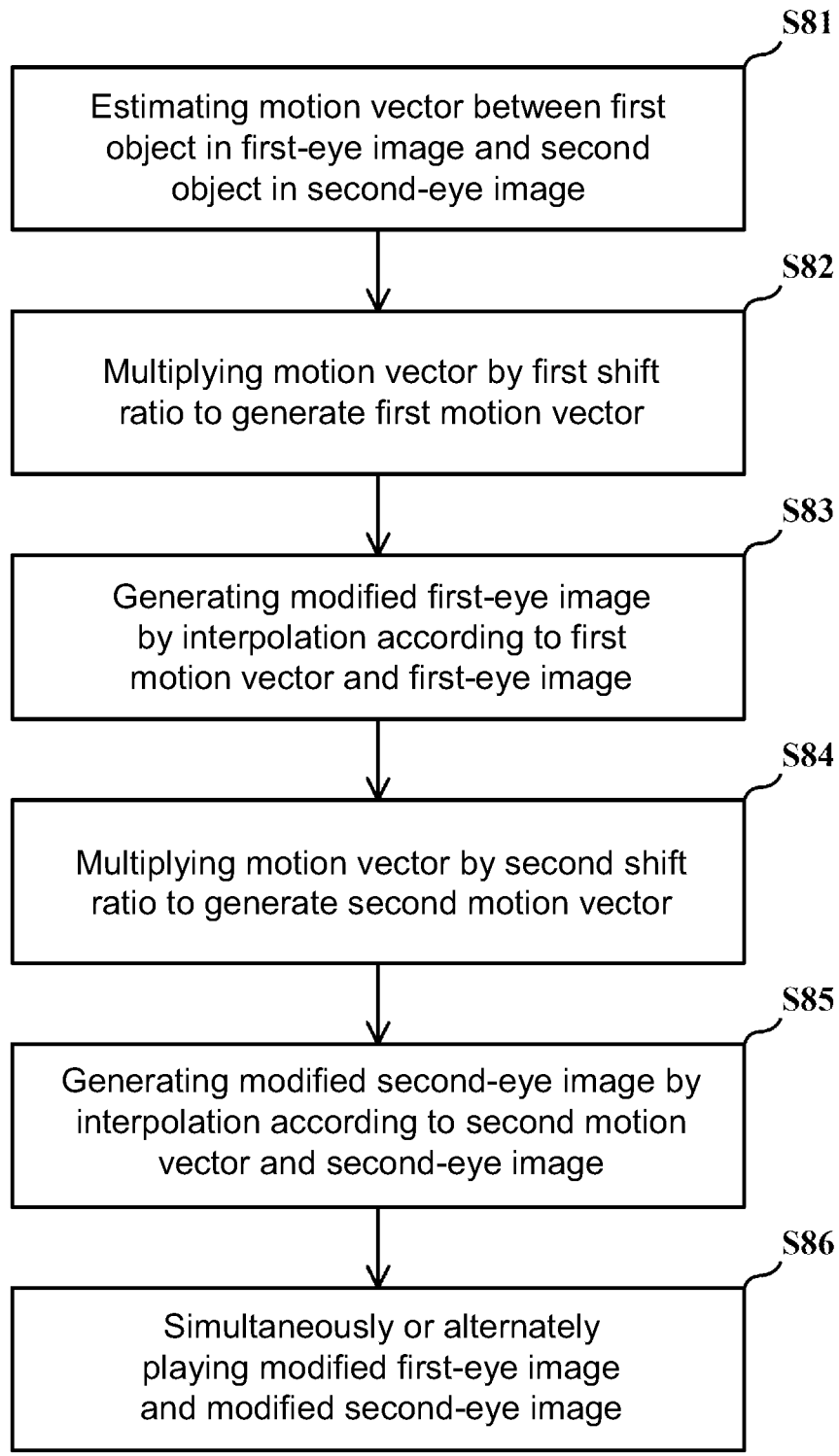
FIG. 8 is a flowchart of a 3D image processing method according to one embodiment of the present invention.

FIG. 8 shows a flowchart of a 3D image processing method according to another embodiment of the present invention. Referring to FIG. 8, in Step S81, a motion vector between a first object in a first-eye image and a second object in a second-eye image is estimated. The first object is the same as or similar to the second object. In Step S82, the motion vector is multiplied by a first shift ratio to generate a first motion vector. In Step S83, according to the first motion vector and the first-eye image, a modified first-eye image is generated by interpolation. In Step S84, the motion vector is multiplied by a second shift ratio to generate a second motion vector. In Step S85, according to the second motion vector and the second-eye image, a modified second-eye image is generated by interpolation. In Step S86, the modified first-eye image and the modified second-eye image are simultaneously or alternately played.

It should be noted that, in a situation where only an object at one side needs to be adjusted, Steps S84 and S85 may be omitted. Further, Step S86 is optional in the flow. Operation details and results of the steps may be referred in associated descriptions on the foregoing 3D image processing apparatus 200, and shall be omitted herein.

Therefore, to satisfy the need for adjusting the 3D image depth, a novel 3D image processing apparatus and 3D image process method is provided as in the description of the embodiments. In the 3D image processing apparatus and method of the present invention, the depth and viewing angle of the 3D image can be adjusted through motion estimation and motion interpolation without implementing a dedicated and complex 3D image device.

It is noted that the motion estimation module and motion interpolation module may be implemented in hardware, software or a combination of hardware and software. For example, an Application Specific Integrated Circuit (ASIC) may be provided that is configured to operate in accordance with the functionality described herein. Likewise, logic instructions stored in a memory (not shown) may be provided which, when executed by processor, cause the processing apparatus 200 to operate in accordance with the functionality described herein.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A three-dimensional (3D) image processing apparatus, comprising:
 a motion estimation module that estimates a motion vector between a first object in a first-eye image and a second object in a second-eye image, the first object being at least similar to the second object; and
 a motion interpolation module that multiplies the motion vector by a first shift ratio, for moving the first object in the first-eye image, to generate a first motion vector, and generating a modified first-eye image by interpolation according to the first motion vector and the first-eye image and further multiplies the motion vector by a second shift ratio to generate a second motion vector, and generates a modified second-eye image by interpolating according to the second motion vector and the second-eye image, wherein a sum of the first shift ratio and the second shift ratio is 1,
 wherein the first-eye image is one of a right-eye image and a corresponding left-eye image, and the second-eye image is the other of the right-eye image and the corresponding left-eye image,
 wherein, when viewed, the first-eye image and the second-eye image are combined into a 3D image, and
 wherein the modified first-eye image is one of another right-eye image and another corresponding left-eye image which, when viewed, are combined into another 3D image.

2. The apparatus according to claim 1, wherein the modified first-eye image comprises a shifted first object corresponding to the first object, the modified second-eye image comprises a shifted second object corresponding to the second object, the first-eye image is a left-eye image, and the second-eye image is a right-eye image; in response to a zoom-in request, the motion interpolation module sets the first shift ratio to locate the shifted first object at the right of the first object, and sets the second shift ratio to locate the shifted second object at the left of the second object; in response to a zoom-out request, the motion interpolation module sets the first shift ratio to locate the first shifted object at the left of the first object, and sets the second shift ratio to locate the second shifted object at the right of the second object.

3. The apparatus according to claim 1, wherein the motion interpolation module generates a left-shifted first-eye image comprising a left-shifted first object and a right-shifted first-eye image comprising a right-shifted first object by interpolation according to the first motion vector and the first-eye image, generates a left-shifted second-eye image comprising a left-shifted second object and a right-shifted second-eye image comprising a right-shifted second object by interpolating the second motion vector and the second-eye image, selects one of the first-eye image, the left-shifted first-eye image and the right-shifted first-eye image as the modified first-eye image, and selects one of the second-eye image, the left-shifted second-eye image and the right-shifted second-eye image as the modified second-eye image; wherein, the left-shifted first object and the right-shifted first object correspond to the first object, and the left-shifted second object and the right-shifted second object correspond to the second object.

4. The apparatus according to claim 1, further comprising:
 a playback module, for simultaneously or alternately displaying the modified first-eye image and the modified second-eye image;
 wherein, the modified first-eye image comprises a shifted first object corresponding to the first object, and the modified second-eye image comprises a shifted second object corresponding to the second object.

5. A three-dimensional (3D) image processing method, comprising:
 estimating a motion vector between a first object in a first-eye image and a second object in a second-eye image, the first object being at least similar to the second object;
 multiplying the motion vector by a first shift ratio, for moving the first object in the first-eye image, to generate a first motion vector;
 generating a modified first-eye image by interpolation according to the first motion vector and the first-eye image;
 multiplying the motion vector by a second shift ratio to generate a second motion vector; and
 generating a modified second-eye image by interpolating according to the second motion vector and the second-eye image, wherein a sum of the first shift ratio and the second shift ratio is 1; and
 displaying the modified first-eye image and the modified second-eye image on a display,
 wherein the first-eye image is one of a right-eye image and a corresponding left-eye image, and the second-eye image is the other of the right-eye image and the corresponding left-eye image, wherein, when viewed, the first-eye image and the second-eye image are combined into a 3D image, and wherein the modified first-eye image is one of another right-eye image and another corresponding left-eye image which, when viewed, are combined into another 3D image.

6. The method according to claim 5, wherein the modified first-eye image comprises a shifted first object corresponding to the first object, the modified second-eye image comprises a shifted second object corresponding to the second object, the first-eye image is a left-eye image, and the second-eye image is a right-eye image; in response to a zoom-in request, the first shift ratio is set to locate the shifted first object at the right of the first object, and the second shift ratio is set to locate the shifted second object at the left of the second object; in response to a zoom-out request, the first shift ratio is set to locate the first shifted object at the left of the first object, and the second shift ratio is set to locate the second shifted object at the right of the second object.

7. The method according to claim 5, wherein the step of generating the modified first-eye image comprises generating a left-shifted first-eye image comprising a left-shifted first object and a right-shifted first-eye image comprising a right-shifted first object by interpolation according to the to the first motion vector and the first-eye image, and selecting one of the first-eye image, the left-shifted first-eye image and the right-shifted first-eye image as the modified first-eye image; and the step of generating the modified second-eye image comprises generating a left-shifted second-eye image comprising a left-shifted second object and a right-shifted second-eye image comprising a right-shifted second object by interpolating the second motion vector and the second-eye image, and selecting one of the second-eye image, the left-shifted second-eye image and the right-shifted second-eye image as the modified second-eye image.

8. The method according to claim 5, further comprising:
simultaneously or alternately displaying the modified first-eye image and the modified second-eye image;
wherein, the modified first-eye image comprises a shifted first object corresponding to the first object, and the modified second-eye image comprises a shifted second object corresponding to the second object.

\* \* \* \* \*